June 19, 1956 W. M. JEFFERS 2,751,574

TRAFFIC SIGNAL CONTROLLER

Filed Aug. 31, 1953 13 Sheets-Sheet 1

INVENTOR.
WALTER M. JEFFERS.
BY
D. EMMETT THOMPSON.
ATTORNEY.

INVENTOR.
WALTER M. JEFFERS.
BY
D. EMMETT THOMPSON.
ATTORNEY.

June 19, 1956 W. M. JEFFERS 2,751,574

TRAFFIC SIGNAL CONTROLLER

Filed Aug. 31, 1953 13 Sheets-Sheet 3

INVENTOR.
WALTER M. JEFFERS.
BY
D. EMMETT THOMPSON.
ATTORNEY.

June 19, 1956 W. M. JEFFERS 2,751,574

TRAFFIC SIGNAL CONTROLLER

Filed Aug. 31, 1953 13 Sheets-Sheet 4

INVENTOR.
WALTER M. JEFFERS.
BY
D. EMMETT THOMPSON.
ATTORNEY.

June 19, 1956 W. M. JEFFERS 2,751,574

TRAFFIC SIGNAL CONTROLLER

Filed Aug. 31, 1953 13 Sheets-Sheet 5

INVENTOR.
WALTER M. JEFFERS.
BY
D. EMMETT THOMPSON.
ATTORNEY.

INVENTOR.
WALTER M. JEFFERS.
BY
D. EMMETT THOMPSON.
ATTORNEY.

INVENTOR.
WALTER M. JEFFERS.
BY
D. EMMETT THOMPSON.
ATTORNEY.

June 19, 1956 W. M. JEFFERS 2,751,574

TRAFFIC SIGNAL CONTROLLER

Filed Aug. 31, 1953 13 Sheets-Sheet 8

INVENTOR.
WALTER M. JEFFERS.
BY
D. EMMETT THOMPSON.
ATTORNEY.

INVENTOR.
WALTER M. JEFFERS.
BY
D. EMMETT THOMPSON.
ATTORNEY.

June 19, 1956 W. M. JEFFERS 2,751,574

TRAFFIC SIGNAL CONTROLLER

Filed Aug. 31, 1953 13 Sheets-Sheet 10

INVENTOR.
WALTER M. JEFFERS.
BY
D. EMMETT THOMPSON.
ATTORNEY.

June 19, 1956 W. M. JEFFERS 2,751,574

TRAFFIC SIGNAL CONTROLLER

Filed Aug. 31, 1953 13 Sheets-Sheet 11

INVENTOR.
WALTER M. JEFFERS.
BY
D. EMMETT THOMPSON.
ATTORNEY.

June 19, 1956 W. M. JEFFERS 2,751,574

TRAFFIC SIGNAL CONTROLLER

Filed Aug. 31, 1953 13 Sheets-Sheet 12

INVENTOR.
WALTER M. JEFFERS.
BY D. Emmett Thompson
ATTORNEY.

June 19, 1956 W. M. JEFFERS 2,751,574

TRAFFIC SIGNAL CONTROLLER

Filed Aug. 31, 1953 13 Sheets-Sheet 13

INVENTOR.
WALTER M. JEFFERS
BY D. Emmett Thompson
Attorney.

United States Patent Office 2,751,574
Patented June 19, 1956

2,751,574

TRAFFIC SIGNAL CONTROLLER

Walter M. Jeffers, Syracuse, N. Y., assignor to Crouse-Hinds Company, Syracuse, N. Y., a corporation of New York Application August 31, 1953, Serial No. 377,332
6 Claims. (Cl. 340—37)

This invention has to do with highway traffic signal controllers, and more particularly to a controller for use in vehicle actuated systems of the so-called normal go type. In such a system, the green or go signal is normally displayed on one street or highway, usually designated as the main street, and the red or stop signal is displayed to the intersecting cross street. This situation prevails until a car approaches the intersection on the cross street, actuating a suitable detector element positioned in the cross street, whereupon the controller operates through a cycle effecting a change in signal indications to permit the car to pass through the intersection, the signal returning to go on the main street.

The timing apparatus in this controller is similar to that disclosed in my copending application, Serial Number 306,913, filed August 28, 1952, issued as Patent 2,719,958 on October 4, 1955, wherein the timing is accomplished by a capacitor and a series of discharge resistors, which are adjustable so that the time required for discharge of the capacitors can be made equal to the length of an interval in the timing cycle. A single capacitor and several discharge resistors are operated selectively to establish the several intervals of the cycle.

In my copending application, the discharge resistor for a given cycle interval is selected automatically by a corresponding cam unit contact. In the arrangement disclosed in this application, part of the cycle is given automatically by the timing mechanism and part of it is controlled by actuation of an external circuit under the control of the vehicle detectors, or pedestrian operated push buttons.

When power is applied to the controller, it operates automatically until it reaches a position to give the green signal to the main street. In the absence of any actuation by cars approaching on the cross street, the green signal is held continuously on the main street. Actuation of the external circuit by a vehicle detector closes a memory relay which causes the cam shaft of the controller to rotate to effect display of the amber signal on the main street. If no further actuation occurs, the cam shaft continues to operate through the cycle and returns to main street green where it remains for a timed interval and continues thereafter until another actuation is received.

If a cross street detector is actuated during the amber cross street signal display, or during the timed part of the main street green, the memory relay causes the controller to repeat the cycle.

The cam shaft unit employed to operate the traffic signals is operable through a number of positions corresponding to the display of the signals. For display of the cross street green signal, the cam shaft is operated through a plurality of positions, the first of which is effective to display the cross street green signal for a period timed by one of the resistors. The extra positions through which the cam shaft operates during the display of the cross street green signal are employed to extend the display of this signal—that is, if the controller is initiated on its cycle by a single actuation, the cam shaft will be moved through the main street amber position to the cross street green position and remain there for the pre-timed period. The cam shaft will then rapidly rotate through the extra positions to the position displaying the cross street amber. In other words, under these circumstances the cam shaft rotates through the extra positions rapidly without stopping, and the display of the cross street green signal is short. On the other hand, if by further actuations the cam shaft stops in any of the extra positions, the cross street green signal is displayed for a longer duration. The first position of the cam shaft during the display of the cross street green signal is timed out by the capacitor resistor circuit. The remaining positions through which the cam shaft operates during display of the cross street green signal are timed by the continuous rotation of the cam shaft by its driving motor in the event of no further actuation, or by the stoppage of the cam shaft because of an actuation, either during the display of the cross street green signal in the first position of the cam shaft for that interval, or by actuations occurring in the next succeeding positions of the cam shaft. The timing of the stoppage of the cam shaft during these extra positions for the cross street green interval is also determined by the capacitor resistor circuit. An adjustable resistor is provided for timing the first position during the display of the cross street green signals, and an adjustable resistor is provided for timing the succeeding or extra positions of the cam shaft during the second part of the cross street green interval in the event of any actuations occurring during the first or second parts of the cross street green interval.

The invention consists in the novel features and in the combinations and constructions hereinafter set forth and claimed.

In describing this invention, reference is had to the accompanying drawings in which like characters designate corresponding parts in all the views.

In the drawings—

Figure 1 illustrates the controller in normal position with the go or green signal being displayed to the main street and the red or stop signal to the cross street.

Figure 2 illustrates the controller upon actuation of one of the detector elements in the cross street.

Figure 1:
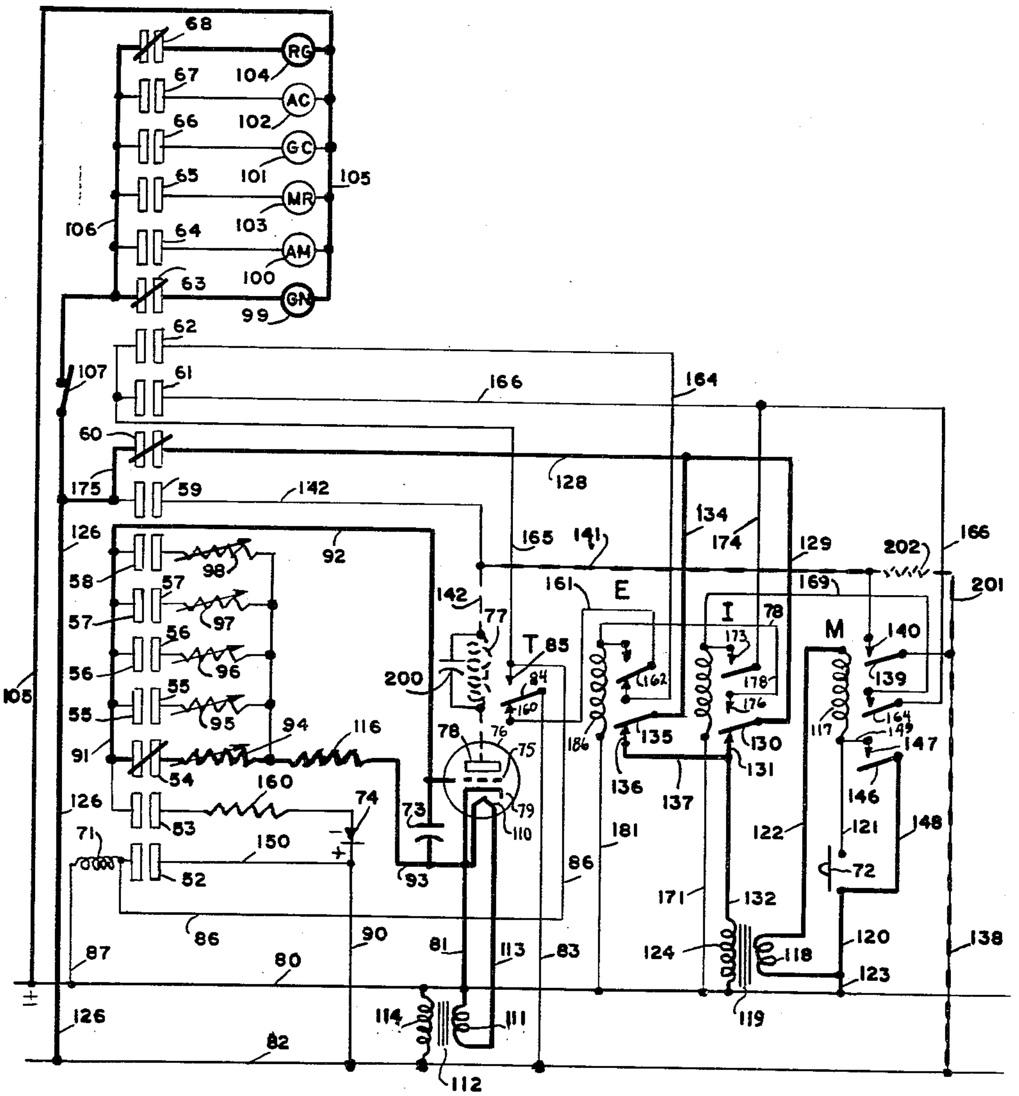
Figures 1 to 11 are schematic diagrams showing the circuit arrangement of the controller in the various positions of the cam shaft during the intervals of the signal cycle and in which the heavy lines indicate the circuits that are then conducting current.
Figure 2:
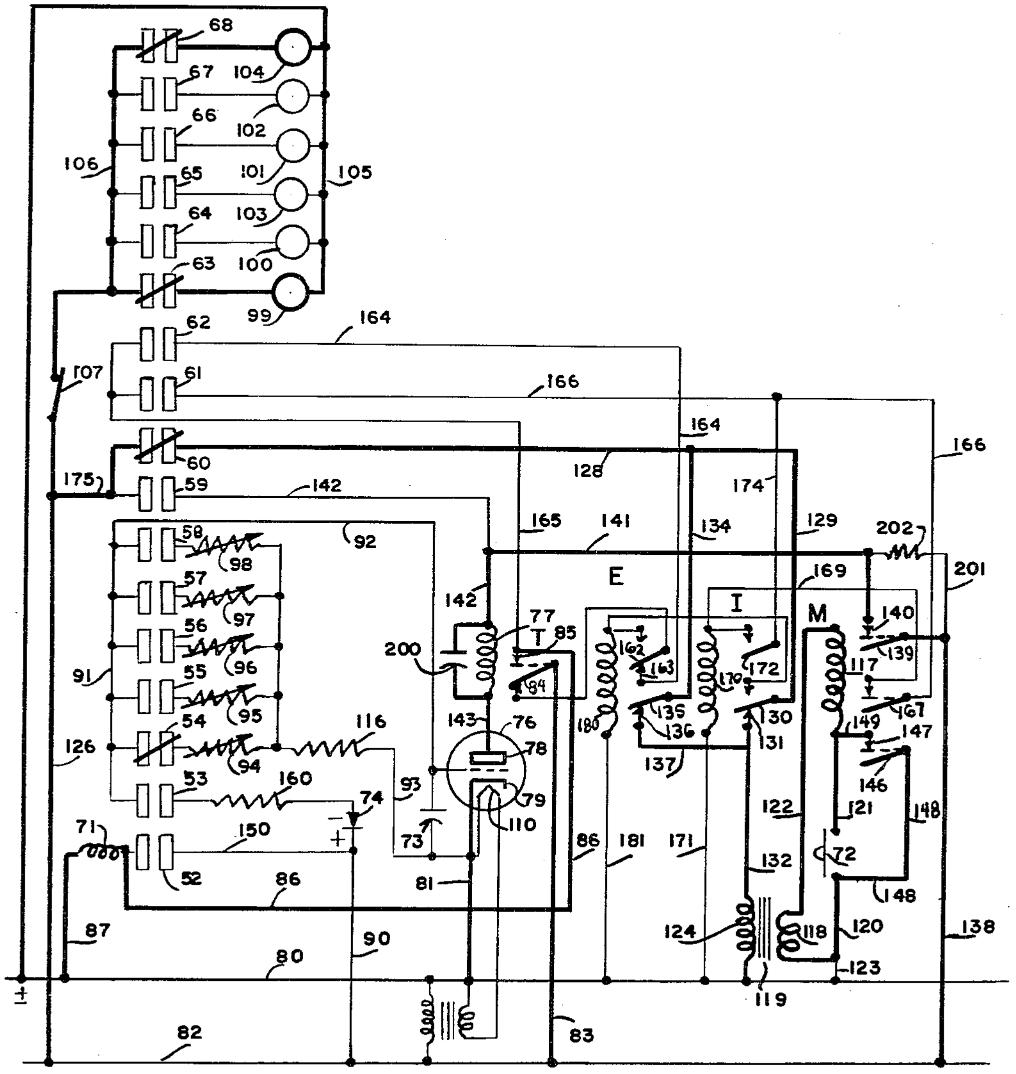
Figure 3:
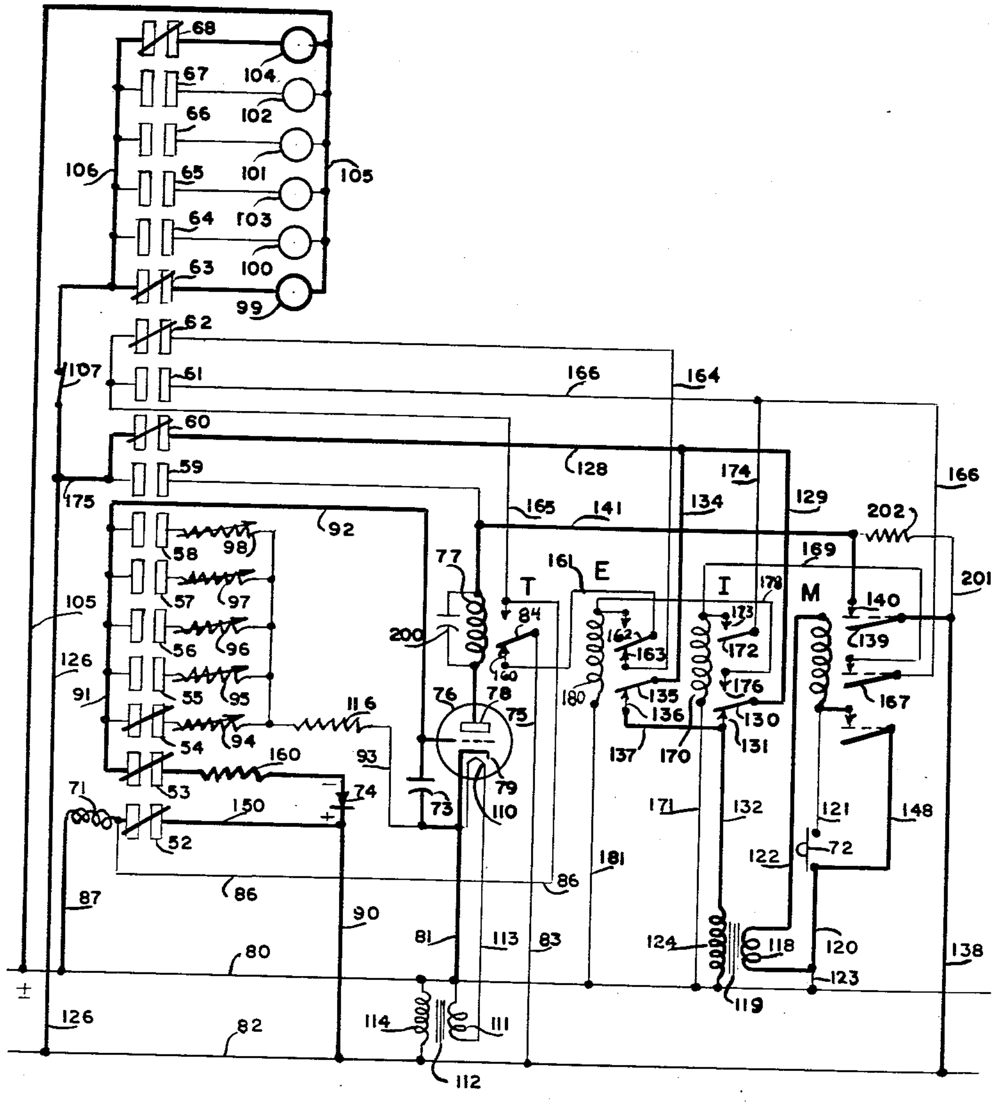
Figure 4:
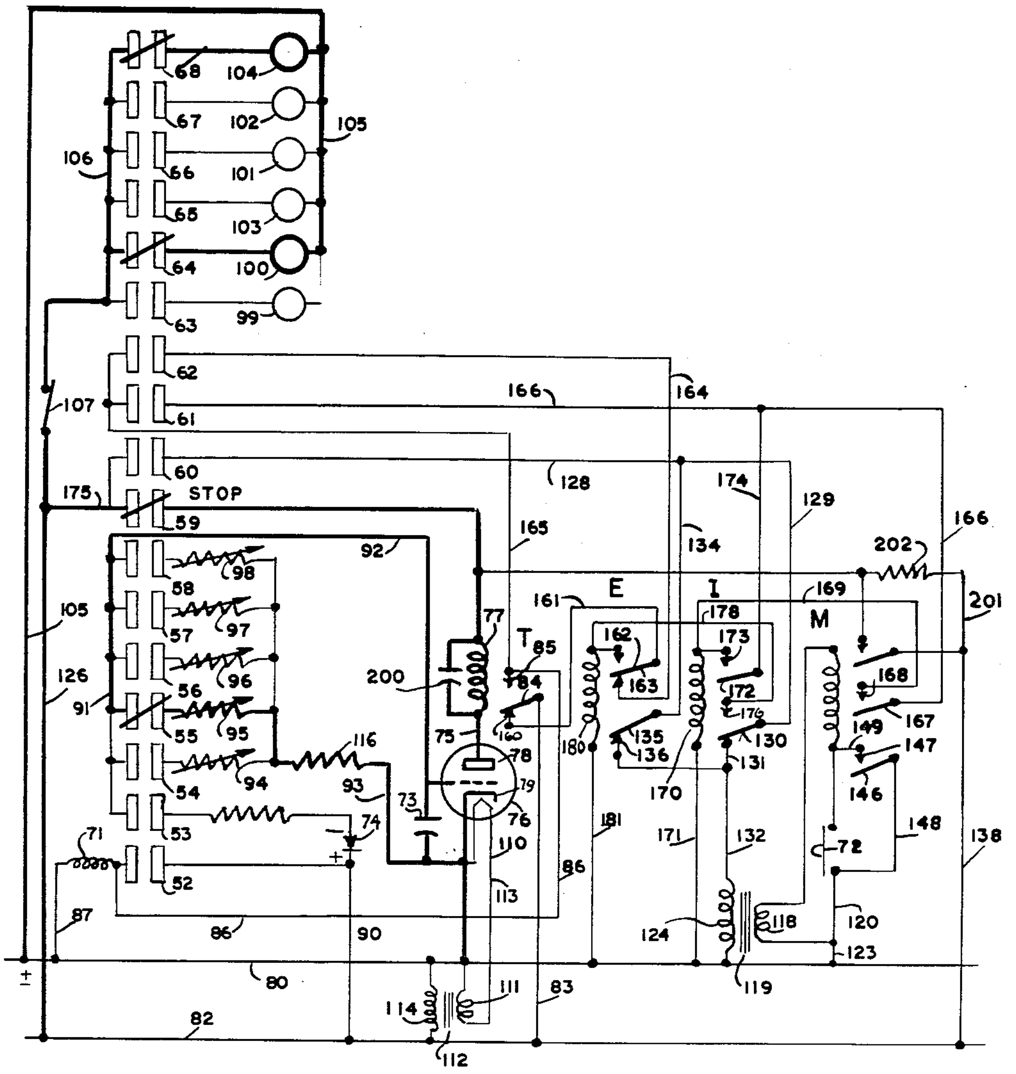

Figure 3 illustrates the condition when the cam shaft is running from position 1, as shown in Figures 1 and 2, to position 2, which is shown in Figure 4.

Figure 4 illustrates the controller advanced to the second position corresponding to the second interval in which the amber or caution signal is displayed to the main street.

Figure 5:
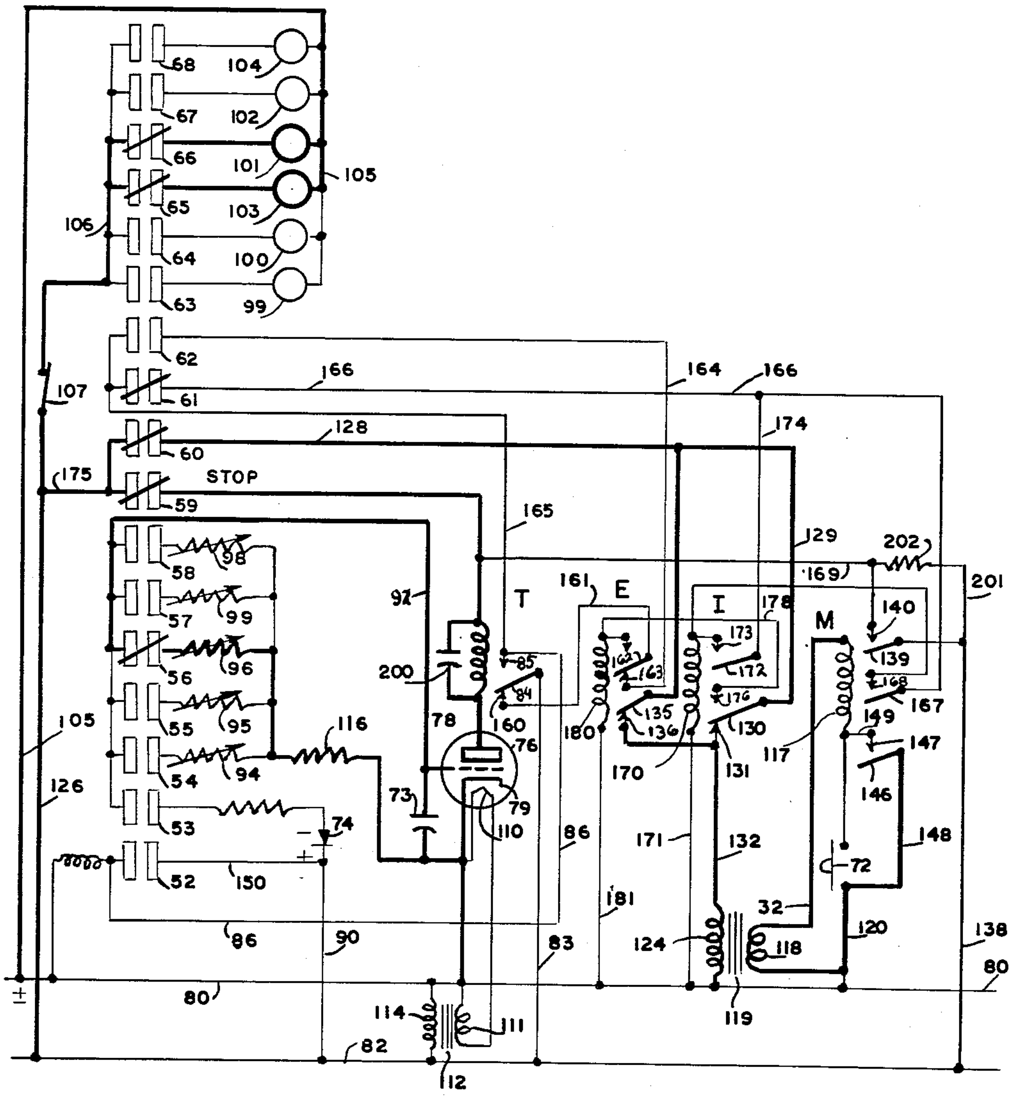

Figure 5 illustrates the controller with the cam shaft advanced to the third position in which the green signal is displayed to the cross street and the red signal to the main street.

Figure 6:
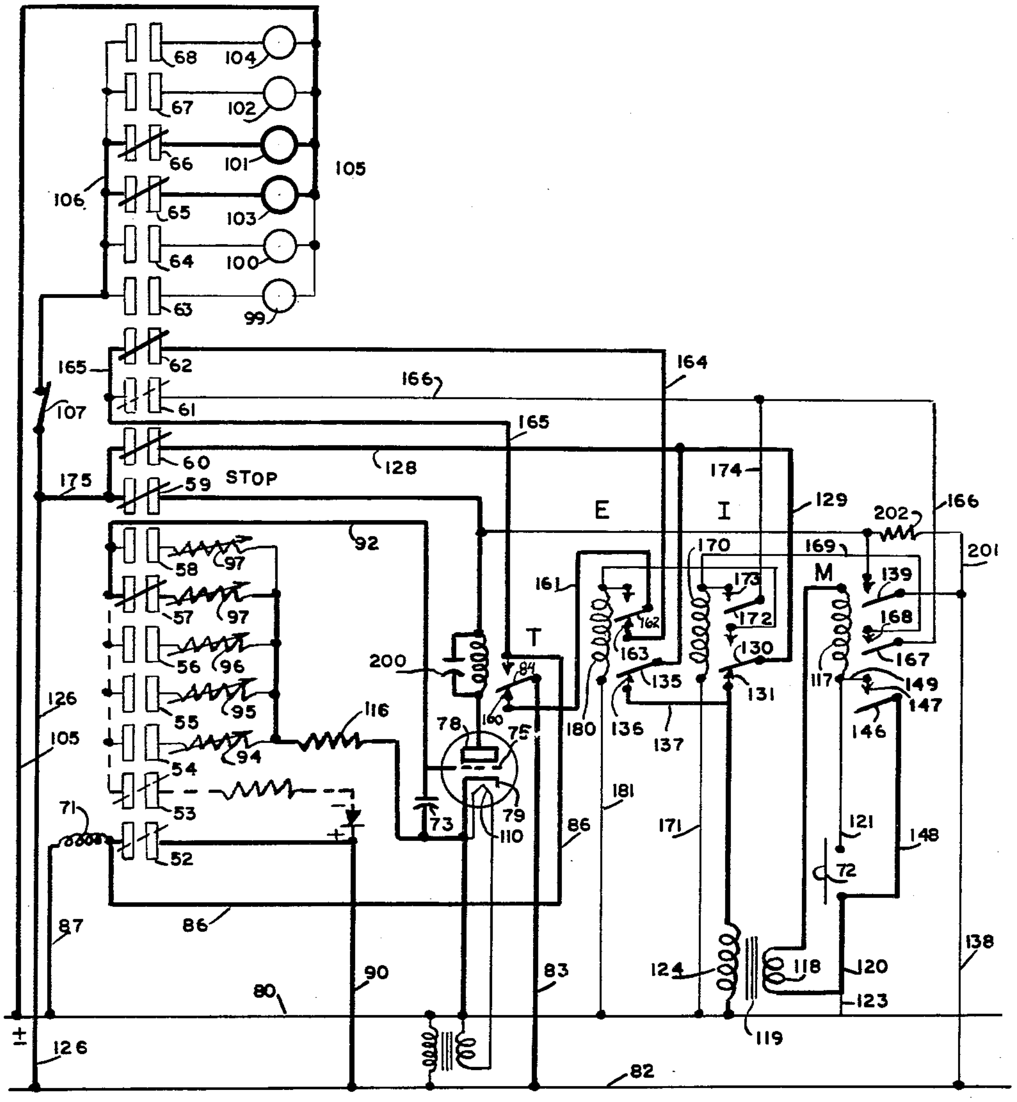

Figure 6 illustrates the controller with the cam shaft advanced to the fourth position for the beginning of the second part of the interval for the display of the green signal to the cross street. The circuit arrangement is essentially the same for positions 5, 6, 7, 8, 9 and 10 in the event of no further actuation.

Figure 7:
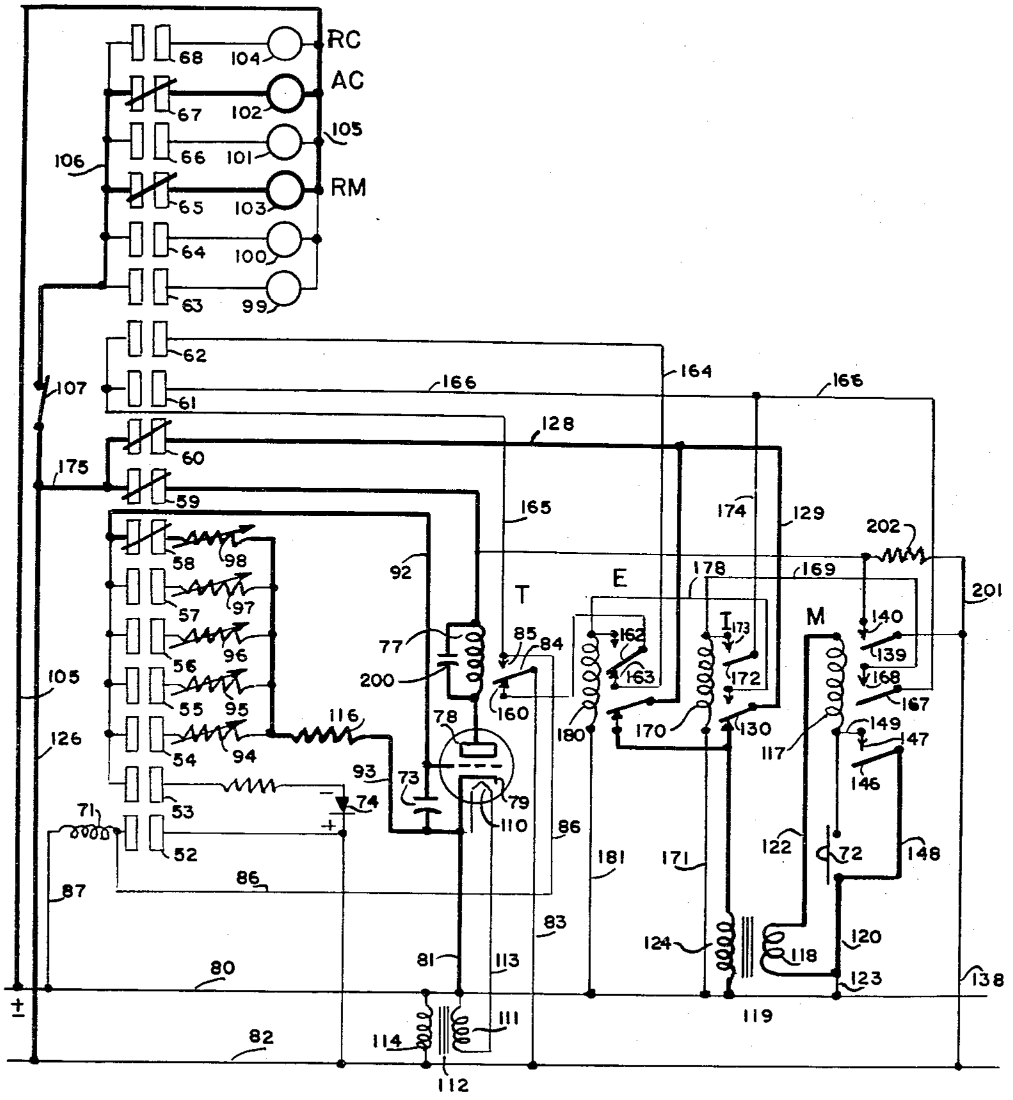

Figure 7 illustrates the controller with the cam shaft advanced to position 11 wherein the amber or caution signal is displayed to the cross street, the red signal continuing on the main street.

Figure 8:
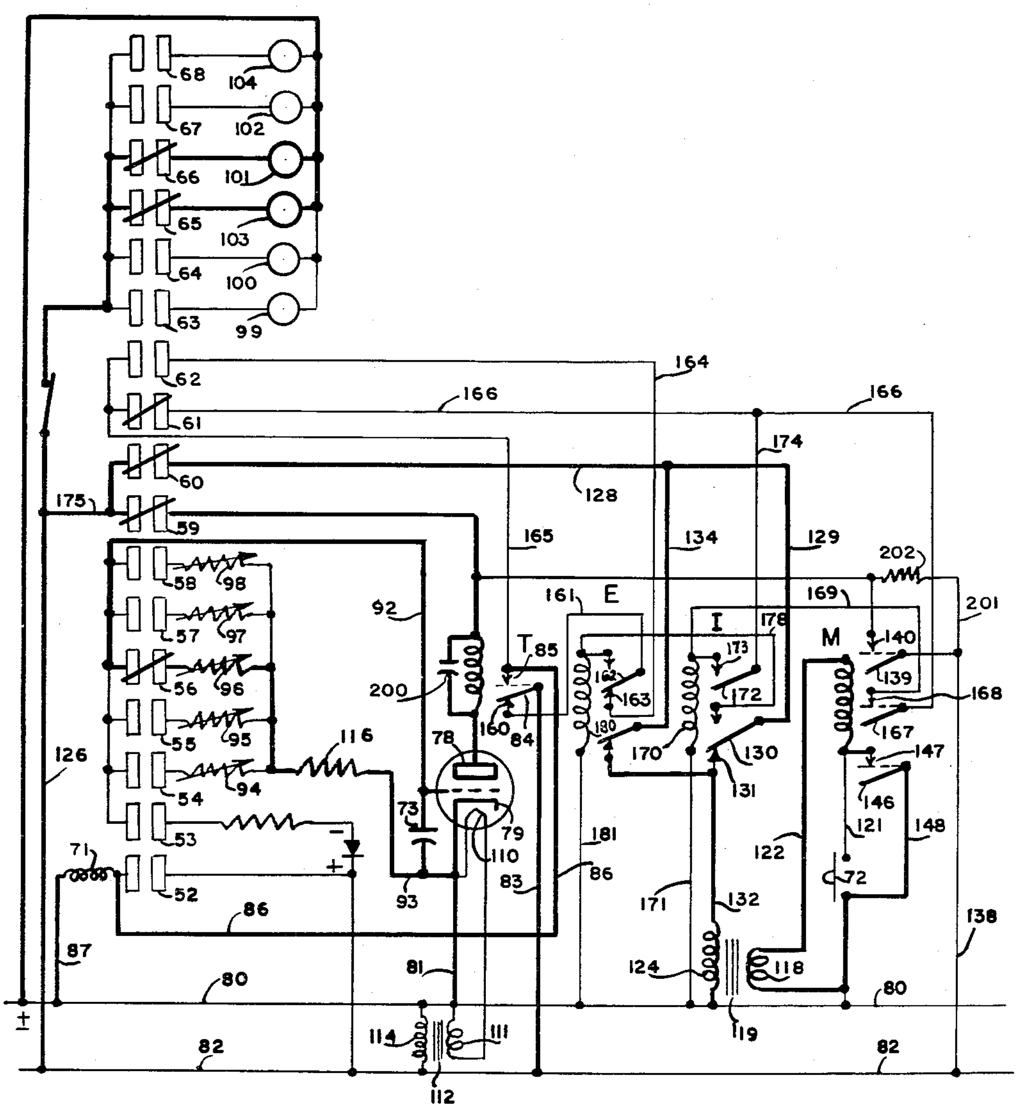

Figure 8 illustrates the controller with the cam shaft in the third position, as shown in Figure 5, except that a detector element has been actuated by a car approaching on the cross street during the first part of the cross street green interval.

Figure 9:
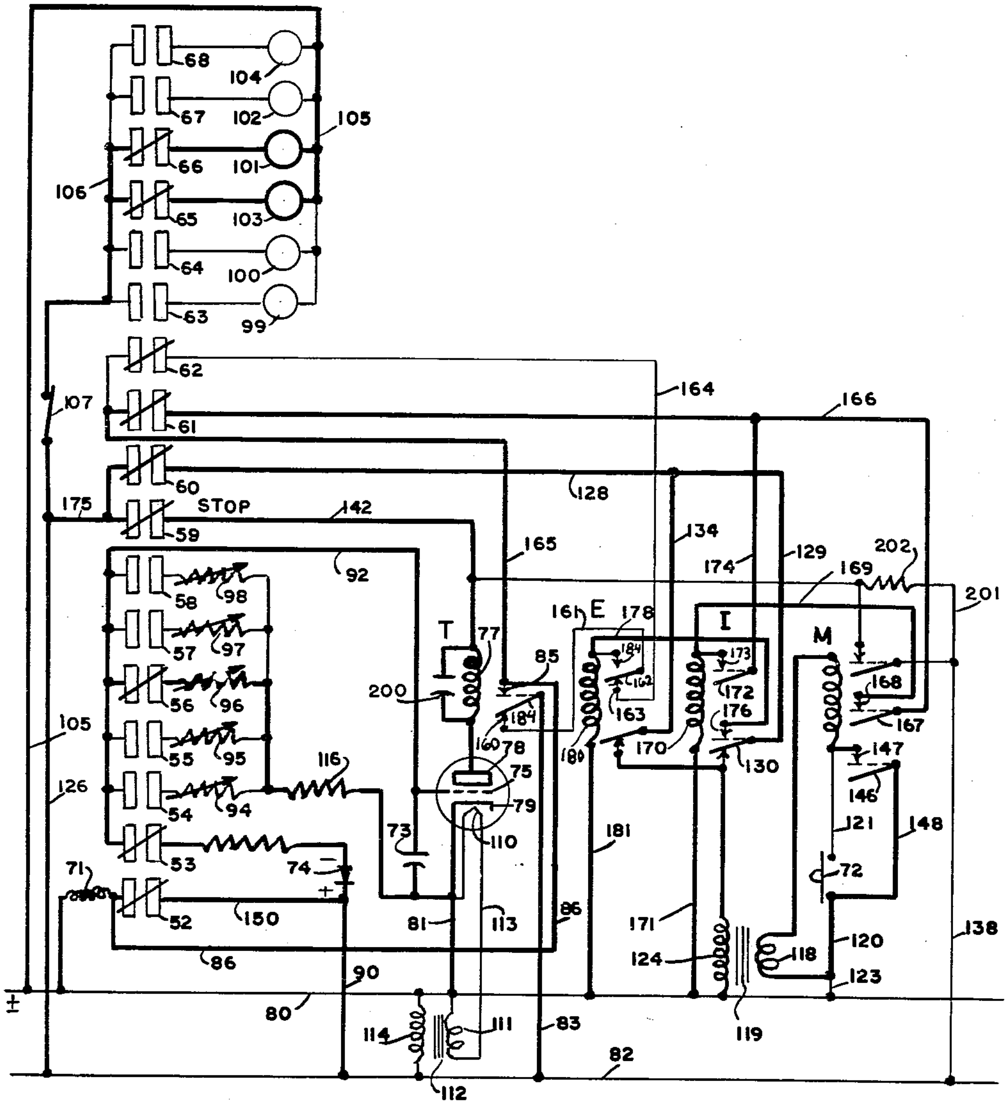

Figure 9 illustrates the arrangement with the cam shaft starting to rotate from position 3 to position 4 following the actuation, as in Figure 8.

Figure 10:
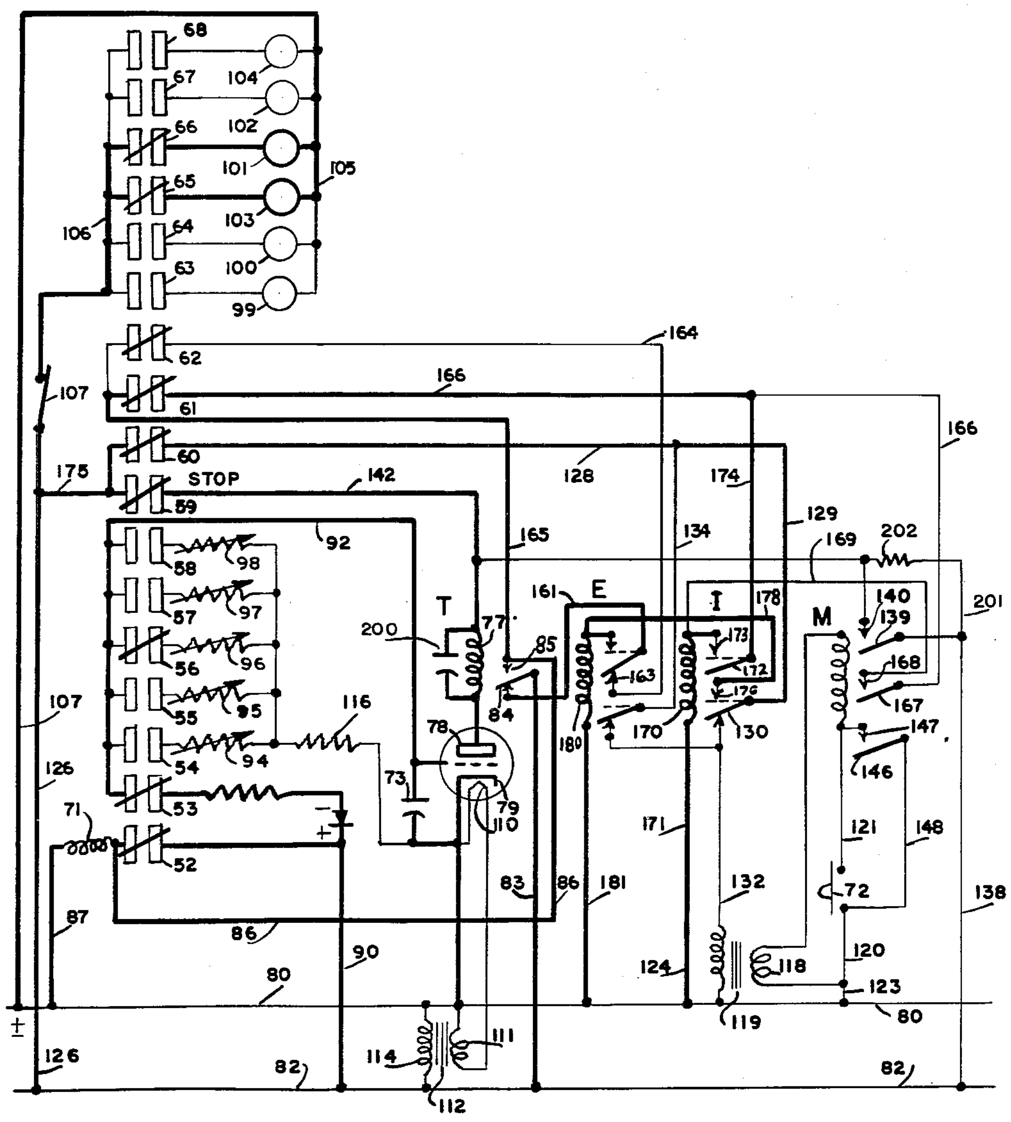

Figure 10 illustrates the circuit arrangement an instant later in the movement of the cam shaft from that shown in Figure 9.

Figure 11:
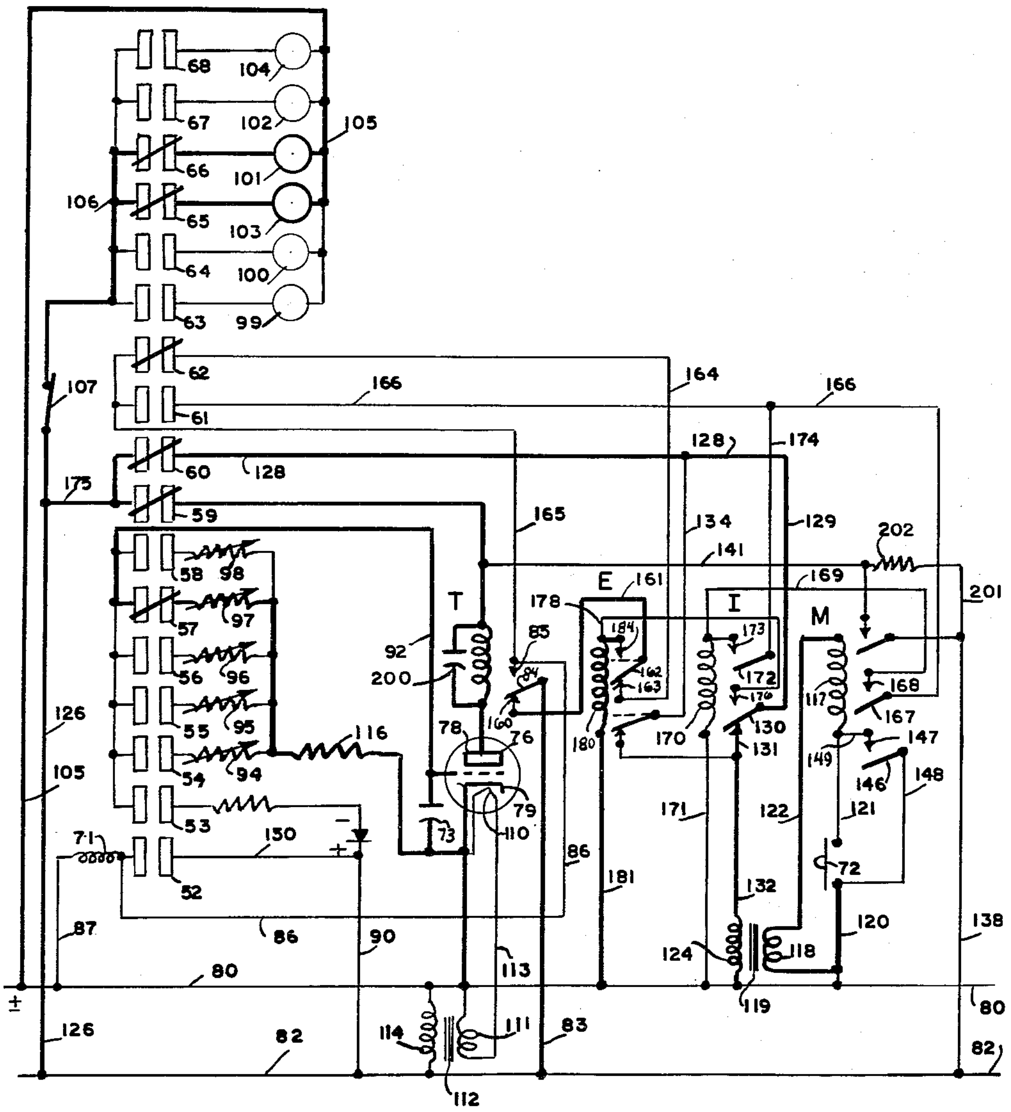

Figure 11 illustrates the circuit arrangement with the cam shaft moved to position 4 the timer timing out for the extension period.

Figure 12:
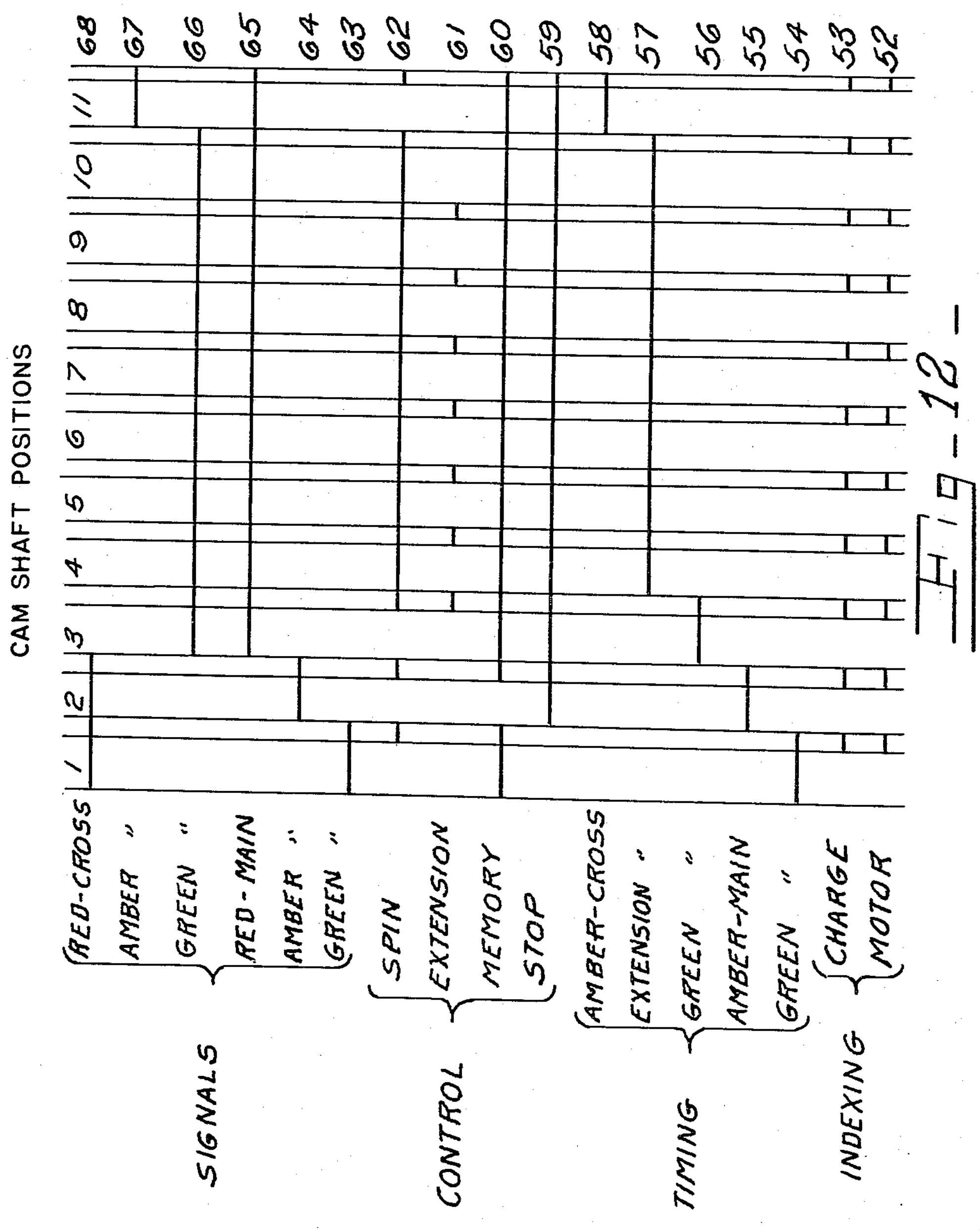

Figure 12 is a sequence chart showing the cam unit contacts closed in each position of the cam shaft.

Figure 13:
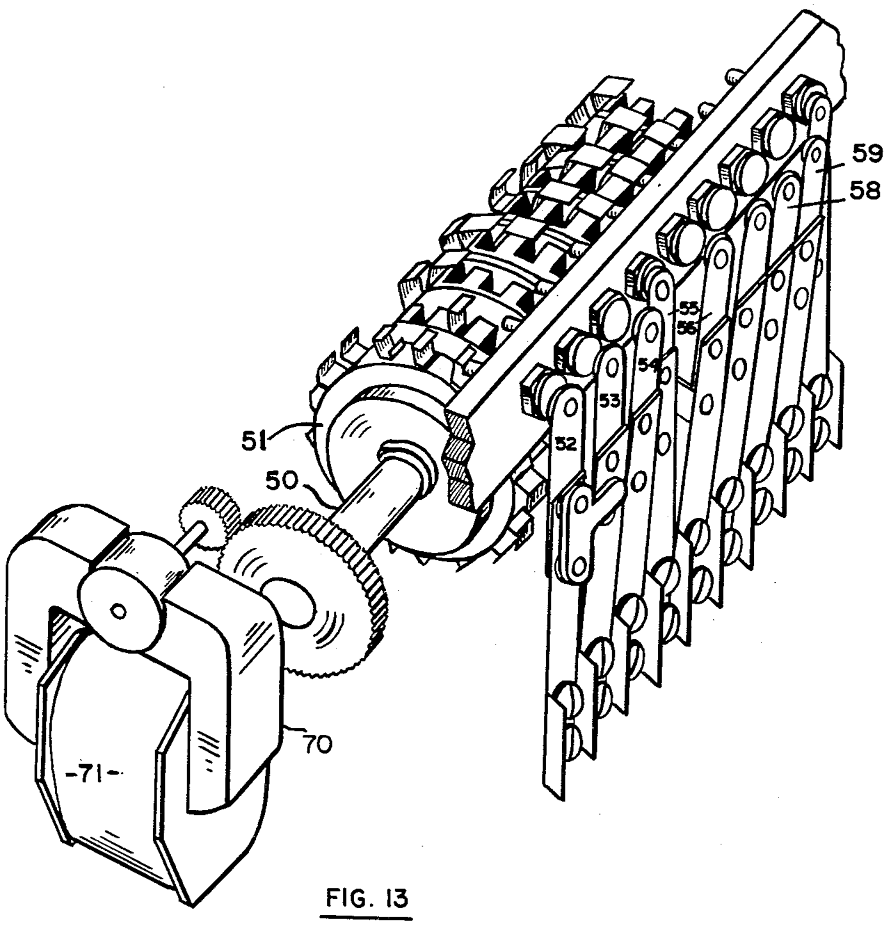

Figure 13 is a diagrammatic view in perspective of a portion of the cam shaft unit showing the driving motor therefor.

The controller consists of a cam shaft 50 on which there is mounted a series of cams 51, Figure 13, having lobes of different lengths and arranged in different angular positions for actuating a series of contacts 52—68, certain of which, as 63—68, are connected in the signal circuits. A motor 70 is connected to the cam shaft and has a running coil 71. This motor is provided with a starting circuit and first and second running circuits. The running circuit is controlled by the contact 52. The starting circuit is initiated by actuation of a detector element 72 operated by vehicular traffic approaching the intersection on the cross street.

The timing portion of the apparatus consists of a capacitor 73 which is charged substantially to peak line potential through a rectifier 74. The capacitor is connected to the grid 75 of an electron tube 76. The coil 77 of a relay T is connected to the plate 78 of the tube. The cathode 79 is connected to the common side 80 of the power supply by wire 81. When relay T is energized, the starting circuit to the motor coil 71 is complete from the hot side 82 of the power supply, through wire 83, movable contact 84, stationary contact 85, wire 86, motor coil 71, wire 87, to the common side 80 of the power supply. The arrangement is such that the tube 76 will not pass current and therefore not energize the relay T connected in the plate circuit when a negative charge of at least predetermined value is placed upon the grid 75. The rectifier 74 has one side connected to wire 82 through wire 90, and the arrangement is such that negative potential is supplied to the capacitor through contacts 53, bus 91, wire 92, to the grid 75, and one side of the capacitor, the opposite side being connected to wire 81 through wire 93. Timing starts when the charging potential is removed by opening the contacts 53 and connecting one of the discharge resistors 94, 95, 96, 97, 98, in shunt with the capacitor 73.

The resistor 94 determines the timing of the display of the main street green signal 99. The resistor 95 determines the timing of the main street amber signal 100. The resistor 96 determines the timing of the first part of the display of the cross street green signal 101. The resistor 97 determines the timing of any extension of the cross street green signal, and the resistor 98 determines the timing of the display of the cross street amber signal 102.

103 designates the main street red, and 104 designates the cross street red. It will be understood that the main street green and the cross street red are displayed simultaneously and the cross street green and main street red likewise. The traffic signals 99—104 are all connected to a common feed wire 105 extending from the common side 80 of the power supply. The contacts 63—68 are connected to a common bus 106 connected to wire 126 by switch 107.

The cathode heater 110 of tube 76 is connected to the secondary 111 of a transformer 112 through wires 81, 113. The primary 114 of the transformer is connected across the power circuit 80, 82. In Figure 1, the controller is idle with the green main and red cross street signals being displayed. In this position, the signal contacts 63, 68, are closed as indicated by the diagonal lines extending across the contacts. Contacts 54 are closed providing a discharge circuit for the capacitor 73 through wire 93, resistor 116, resistor 94, closed contacts 54, bus 91, wire 92. The resistor 116 is connected in this circuit to prevent a setting of zero resistance in the discharge circuits—that is, it establishes a practical minimum limit on the intervals.

When the capacitor 73 has been discharged to a predetermined value, which means the negative potential on the grid 75 has been reduced to that value, the tube 76 is in condition to pass current through the plate circuit of the tube. Figure 2 of the drawings illustrates the circuit arrangement when the detector 72 has been actuated. This closes a circuit through the coil 117 of the relay M, the circuit being traced from the secondary 118 of transformer 119 by wire 120, detector 72, wire 121, relay coil 117, wire 122. One side of the secondary 118 is connected to the common power lead 80 by wire 123 to decrease the possibility of electric shock to pedestrains who operate the detector 72 in the form of a push button.

The primary coil 124 of the transformer 119 is energized through the closed cam contacts 60. This circuit extends from the hot side 82 of the power supply through wires 126, 127, contacts 60, wires 128, 129, contacts 130, 131, of relay I, wire 132, primary 124, to the common side 80. There is also provided a branch circuit extending from wire 128, through wire 134, contacts 135, 136, of relay E, wire 137, to wire 132. The relay contacts referred to are back contacts—that is, they are engaged when the relays E and I are deenergized.

With power thus applied to coil 117 of relay M, a circuit is completed through tube 76 by wire 138 extending from the hot side 82 of the supply, contacts 139, 140 of relay M, wire 141, 142, coil 77 of relay T, wire 143, plate 78, cathode 79, wire 81, to the common side 80 of the supply. This effects movement of contact 84 into engagement with contact 85 to provide power to the motor coil 71 through wire 83, contacts 84, 85, wire 86, motor coil 71, wire 87. The relay M is locked up through contacts 146, 147, which form, in conjunction with wires 148, 149, a stick circuit.

Motor 70 now effects rotation of the cam shaft 50, whereupon contacts 52 immediately close to provide a first running circuit for the motor, this being traced from power wire 82, wire 90, wire 150, contacts 52, coil 71, wire 87, to the common side 80 of the supply.

Figure 3 illustrates the arrangement with the controller running from position 1 to position 2. It will be observed that the motor contacts 52 are closed. These contacts always close upon the initial movement of the cam shaft and remain closed until the cam shaft has been advanced to the next succeeding position as indicated on the cam chart, Figure 12. Also during each movement of the cam shaft, the charging contacts 53 are closed. This provides a charging circuit for the capacitor 73, this circuit extending from the supply wire 82, through wire 90, rectifier 74, resistor 160, contacts 53, bus 91, wire 92, applying a negative peak potential on the grid 75 of tube 76. The purpose of the resistor arm 160 is to limit the rate of the capacitor charge by the rectifier 74, thus protecting the rectifier against current surge. The instantaneous charge of the capacitor 73 renders the tube 76 non-conductive and relay T opens.

In Figure 4, the cam shaft has advanced to position 2 with contacts 63 open, extinguishing the main street green signal 99 and contacts 64 closed to show the main street amber signal 100. The memory contacts 60 have opened disconnecting the primary coil 124 of transformer 119 to open relay M. The stop contacts 59 are closed to maintain potential on plate 78 of the tube and contacts 55 have closed allowing the capacitor 73 to discharge through the resistor 95, this circuit including wire 93, resistors 116, 95, bus 91, wire 92.

Inasmuch as the stop contacts 59 are closed, the tube 78 will conduct current when the capacitor 73 has been discharged by the resistor 95, closing relay T, furnishing power to the motor coil 71 through wire 83, contacts 84, 85, wires 86, coil 71, wire 87, to the common side of the power supply. The motor 70 will now rotate the cam shaft to position 3, as shown in Figure 5. During the movement of the shaft from position 2 to 3, the capacitor 73 was again charged by the closing of the charging contacts 53, as previously explained. In this position contacts 66 and 65 are closed, displaying the cross street green signal 101 and the main street red signal 103. Contacts 56 have closed to connect the resistor 96 in the discharge circuit of the capacitor and when the same is discharged through the resistor 96, tube 76 will become conductive to close relay T because contacts 59 are closed to provide a potential on the tube plate 78. This will effect further rotation of the cam shaft to position 4. However, in the absence of actuation of detector 72, the cam shaft will not stop in position 4 but will continue to rotate until it reaches position No. 11, shown by Figure 6. During this movement of the cam shaft through positions 4 to 10 inclusive, contacts 65, 66 remain closed, giving the green signal to the cross street and red to the main street, and during this movement of the shaft through these positions, contacts 59 also are closed to provide potential on plate 78. As previously stated, the capacitor 73 is charged during movement of the cam shaft from each position to the next succeeding position.

However, the capacitor 73 does not have time to discharge during the rapid movement of the cam shaft from one of these positions to the next. Accordingly, the tube 76 does not pass current and therefore relay T remains deenergized. However, a second running circuit for operating the motor 70 can be traced from power wire 82, wire 83, contacts 84, 160, wire 161, contacts 162, 163, wire 164, spinning contacts 62, which are closed through positions 4 to 10, wire 165, wire 86, motor coil 71, wire 87, to the common side 80 of the supply. The motor continues to run on this circuit until the spinning contacts 62 open in position 11, as shown in Figure 7. The cam shaft will thus pass rapidly through the extension positions of the green signal on the cross street regardless of the timing set on the extension resistor 97.

In position 11, contacts 66 open and contacts 67 close, displaying the amber signal to the cross street. Contacts 65 remain closed, displaying the red signal to the main street. With the cam shaft stopped in this position, contacts 58 are closed, putting the resistor 98 in the discharge circuit of capacitor 73, and the motor remains stopped until the charge on the capacitor 73 is removed through the resistor 98, at which time tube 76 will become again conductive, closing contacts 84, 85, to provide the starting circuit for the motor 70 to advance the cam shaft to position 1 with the contacts 63, 68, closed, returning the green signal to the main street and the red to the cross street, and closing contacts 54 to put resistor 94 in the discharge circuit of capacitor 73. The motor and cam shaft now remain stopped until resistor 94 removes the charge from the capacitor and an actuation of detector 72 takes place.

Now assume that the detector 72 is actuated during the initial part of the cross street green signal display, wherein the controller is in position 3, as shown in Figure 5 of the drawing. The circuit arrangement upon the happening of this event is shown in Figure 8 of the drawings. The relay M again closes and locks through contacts 146, 147. At the end of the interval timing for this position, relay T will close, as previously explained, furnishing a starting circuit for motor coil 71, through contacts 84, 85, and a new circuit is established from the hot side 82 of the power supply through wire 83, contacts 84, 85, wire 165, extension contacts 61, wire 166, contacts 167, 168, of relay M, wire 169 to the coil 170 of relay I, wire 171, to the common side 80 of the supply. Relay I closes and locks, as shown in Figure 9, by contacts 172, 173, contact 172 being connected to wire 166 by wire 174.

Immediately there exists the condition shown in Figure 10 of the drawings. When relay I closes, an additional circuit is completed from wire 82, over wires 126, 175, cam contacts 60, wires 128, 129, contacts 130, 176, wire 178 to coil 180 of relay E, wire 181, to the common side 80 of the supply. With both relays E and I closed, there is no longer feed for the primary coil 124 of transformer 119 and accordingly, relay M opens.

As the cam shaft 50 rotates, contacts 52, 53, close, contacts 52 maintaining the feed on the motor. Contacts 53 recharge the capacitor 73 and relay T opens while the motor is still running, see Figure 10. When the cam shaft reaches the next position, see Figure 11, a circuit is completed from line 82, through wire 83, contacts 84, 160, wire 161, contacts 162, 184, to establish a holding circuit for coil 180 of relay E. Relay E holds closed through this circuit until extension time expires by discharge of capacitor through resistor 97, whereupon tube 76 passes current to energize relay T, moving contact 84 out of engagement with contact 160.

With relay E energized, contact 162 is held out of engagement with contact 163, thus interrupting the circuit through the spinning contact 62, whereby with the second running contacts 52 and the spinning circuit through contact 62 being both open, the cam shaft motor stops, holding relay E closed, until the extension time expires by the discharge of the capacitor 73 through the resistor 97, whereupon tube 76 passes current through the contacts 59 to energize relay T, moving contact 84 out of engagement with contact 160 to break the holding circuit to relay E and transferring the feed for the starting circuit through wire 83 to wire 86, furnishing power to the motor coil 71. The motor will now spin the cam shaft through positions 5 to 10 unless there is further actuation of the detector 72.

Since relay I is deenergized during position 4 of the cam shaft and memory contacts 60 are closed during positions 2 to 11 inclusive, a hot feed is furnished through wires 128, 129, contacts 130, 131, wire 132, to coil 124 of the transformer 119, whereby power is available for operating relay M in the event of an actuation of the detector 72 during interval 4, or any of the succeeding intervals from 4 to 10, and any such actuation will effect an extension interval timed also by the resistor 97. That is, an actuation in each extension interval effects an extension in the succeeding interval or position until position 10 is reached.

When the cam shaft reaches position 10, the extension contacts 61 are opened whereby no operating current is furnished through contacts 167, 168, wire 169, to the coil 170 of relay I. An actuation when the cam shaft is in position 10 cannot result in closure of the relay I and the only effect is that the relay M remains closed until the cam shaft reaches position 1 with the go signal on the main street, whereupon the cycle is repeated.

It will be apparent the minimum time the cam shaft remains in position 1 with the main street go signal displayed is determined by the setting of the resistor 94. That the detector relay M functions upon actuation of the detector 72 to complete the plate circuit to energize relay 77. That the timing for position 2 with the display of the main street amber signal is determined by the setting of resistor 95, and the timing of the initial portion of the display of the cross street green is determined by the setting of resistor 96.

The timing of the remainder of the cross street go signal display is determined by the length of time it takes the motor to rotate the cam shaft through the remaining positions of the cross street go. In the absence of additional actuations, or if there are additional actuations, by the number of such actuations and the setting of resistor 97.

Upon actuation during the remaining or extension periods of the cross street go signal the relay M functions to pull up relay E through the intermediate relay I to open the motor circuit. This stops rotation of the cam shaft and until relay T again pulls up when resistor 97 has discharged the capacitor 73. In the meantime when relays I and E were both pulled up the supply circuit for relay T was opened permitting the relay to reset. Inasmuch as the extension contacts 61, providing the closing and holding circuits for relay I, are closed only during actual movement of the cam shaft from one position to the next, relay I is released during the timing of the extension, thereby reestablishing the operating circuit for relay M so that it is available to respond to any further actuation. As the holding circuit for relay E is through the back contacts of relay T this holding circuit is open when relay T closes at the end of the timed extension period, whereby both relays E and I are ready to function in response to further actuation of the detector to provide additional timed extensions of the cross street go signal.

The capacitor 200 connected in shunt with relay T functions to reduce chatter in the relay contacts as will be well understood. The circuit connected in shunt with relay contacts 139, 140 and consisting of wire 201 and resistance 202, is to constantly provide a small current through the plate circuit of tube 76 to prevent premature deterioration of the tube. This current is insufficient to operate relay T. The overlaid dotted line for wires 138, 201, resistance 202, wires 141, 142 is to indicate the presence of current insufficient to operate relay 77.

What I claim is:

1. A signal controller for controlling the go, caution and stop signals at the intersection of a main street and a cross street, a cam shaft having a series of cams thereon, a switch actuated by each cam, certain of said switches being connected in signal circuits, a motor operatively connected with said shaft to effect rotation thereof step by step through a succession of positions, there being one position for the display of the main street go signal, one position for the display of the main street caution signal, one position for display of the cross street caution signal, a position for the display of the initial portion of the cross street go signal, and a series of positions for the display of the remainder of cross street go signal, a first motor running circuit energized through one of said cam actuated switches normally open and being closed only during rotation of the cam shaft, a motor starting circuit, a relay operable when energized to connect said starting circuit to a power supply, a timer for controlling said relay including a series of control elements individually operable by a series of cam actuated switches normally open and being closed respectively during the various positions of the cam shaft, each of said control elements being operable to cause said timer to energize said relay after the elapse of a predetermined period of time, a second running circuit for said motor including the contacts of said relay when the same is deenergized, another one of said cam actuated switches closed during the display of the cross street go signal and a switching mechanism, a detector element positioned in the cross street for actuation by traffic approaching the intersection and operable upon actuation during display, of the cross street go signal to actuate said switch mechanism to open said second running circuit.

2. A signal controller for controlling the go, caution and stop signals at the intersection of a main street and a cross street, a cam shaft having a series of cams thereon, a switch actuated by each cam, certain of said switches being connected in signal circuits, a motor operatively connected with said shaft to effect rotation thereof step by step through a succession of positions, there being one position for the display of the main street go signal, one position for the display of the main street caution signal, one position for display of the cross street caution signal, a position for the display of the initial portion of the cross street go signal, and a series of positions for the display of the remainder of the cross street go signal, an electron discharge tube having grid cathode and plate elements, a relay connected in the output of said tube, said output circuit also including one of said cam actuated switches closed during all positions of the cam shaft except display of the main street go signal, a motor starting circuit including a contact of said relay when energized, said output circuit having a branch circuit including a contact on a second relay when the same is energized, a first motor running circuit energized through one of said cam actuated switches normally open and being closed only during rotation of the cam shaft, a detector element positioned in the cross street for actuation by traffic approaching the intersection, a detector element circuit including another cam actuated switch closed during all positions of the cam shaft except during display of the main street caution signal and the coil of said second relay, a condensor connected between the grid and cathode of said tube, a condensor charging circuit including another cam actuated switch normally open and closed during each rotating movement of the cam shaft, said condensor charging circuit being operable upon each closure of said last mentioned contact to apply high negative potential on said grid element, a condensor discharge circuit including a series of said cam actuated switches normally open and being closed respectively during the various positions of the cam shaft, a motor starting circuit connected to a power supply through the contacts of said first relay when the same is energized, switching mechanism, a second running circuit for said motor including a contact of said first relay when the same is deenergized, another one of said cam actuated switches closed during display of said remainder portion of the cross street go signal, and said switching mechanism, said detector element being operable upon actuation during display of the cross street go signal to energize said second relay, and said second relay being operable when energized to actuate said switch mechanism to open said second running circuit.

3. A controller as defined in claim 2 wherein said switching mechanism consists of a pair of relays and said detector element circuit is connected through a contact of each said relays in parallel when said relays are deenergized.

4. A traffic signal controller as defined in claim 2 wherein said switching mechanism consists of a third and fourth relay, said third relay being energized by said second relay when the detector element is actuated, and said third relay being operable upon such energization to energize said fourth relay, said second running circuit being connected through a contact of said fourth relay when the same is energized.

5. A traffic signal controller as defined in claim 2 wherein said switching mechanism consists of a third and fourth relay energized successively by actuation of the detector and said second running circuit being connected through a contact of said fourth relay when the same is energized and said fourth relay being provided with a holding circuit through a contact of said first relay when the same is deenergized.

6. A traffic signal controller as defined in claim 2 wherein the switching mechanism consists of the third and fourth relays energized successively on actuation of the detector, the detector element circuit being connected to a contact on each of said third and fourth relays when the same is deenergized, a holding circuit for said third relay connected through the cam actuated switch of the detector element circuit and a holding circuit for said fourth relay connected through a contact of said first relay when the same is deenergized.

References Cited in the file of this patent

UNITED STATES PATENTS

| | | |
|---|---|---|
| 2,090,619 | Biach et al. | Aug. 24, 1937 |
| 2,090,655 | Wilcox | Aug. 24, 1937 |
| 2,126,431 | Von Opel | Aug. 9, 1938 |